United States Patent

[11] 3,540,752

[72] Inventors Sylvester J. Anuskiewicz
James M. Anuskiewicz, 625 Pennsylvania Ave., Oakmont, Pennsylvania 15139
[21] Appl. No. 821,224
[22] Filed May 2, 1969
[45] Patented Nov. 17, 1970

[54] ADJUSTABLE LUGGAGE CARRIER
8 Claims, 7 Drawing Figs.
[52] U.S. Cl................................................. 280/35, 280/47.37
[51] Int. Cl..................................................... B62b 3/02
[50] Field of Search.......................................... 280/35, 47.17, WSB, 47.34, 47.37; 190/18(.2)

[56] References Cited
UNITED STATES PATENTS
| 1,099,933 | 6/1914 | Pohrer.......................... | 190/18.2X |
| 1,176,876 | 3/1916 | Vartabedian................. | 280/35 |
| 1,561,122 | 11/1925 | Stahl............................ | 280/35 |
| 1,788,150 | 1/1931 | Curtin.......................... | 280/35 |

FOREIGN PATENTS
| 242,073 | 9/1946 | Switzerland............... | 280/35 |

Primary Examiner—Leo Friaglia
Assistant Examiner—Leslie J. Paperner
Attorney—Brown, Murray, Flick & Peckham ABSTRACT: Described is an adjustable luggage carrier, totally mechanical in nature and fully collapsible in design, utilizing a variety of light weight structural members arranged in a suitably structured configuration so as to increase or decrease the capacity of the device to accommodate pieces of luggage of various sizes and shapes.

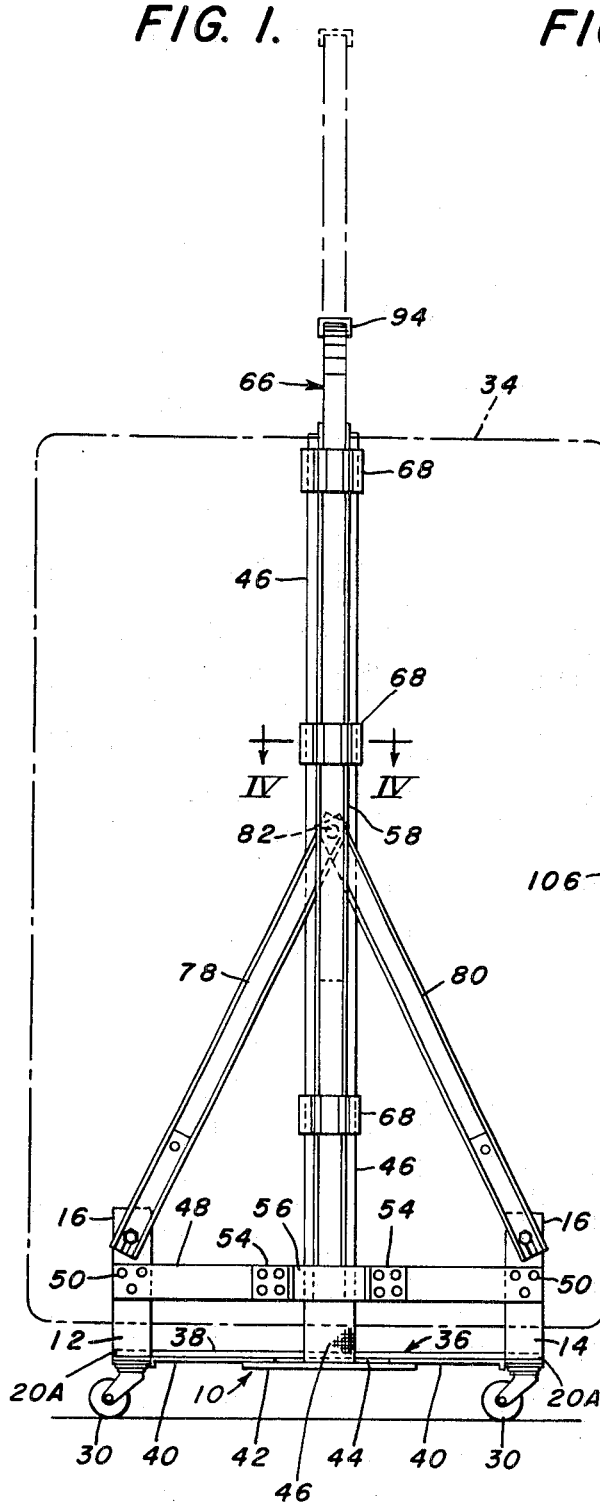
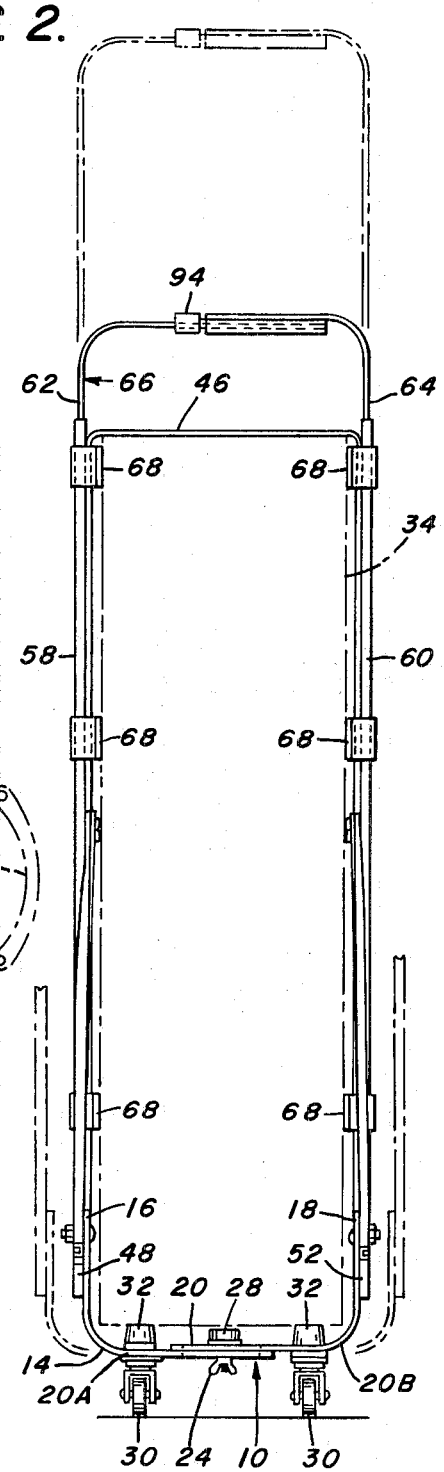
INVENTORS.
SYLVESTER J. ANUSKIEWICZ &
JAMES M. ANUSKIEWICZ
By Brown, Murray, Flick & Peckham
Attorneys

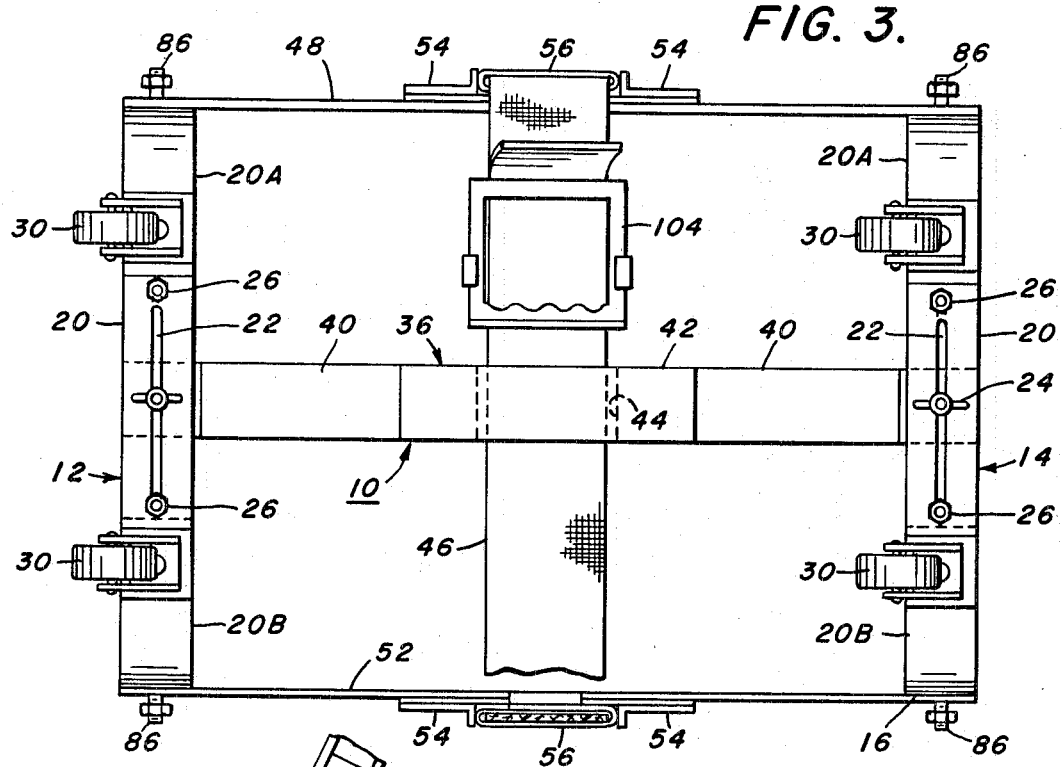
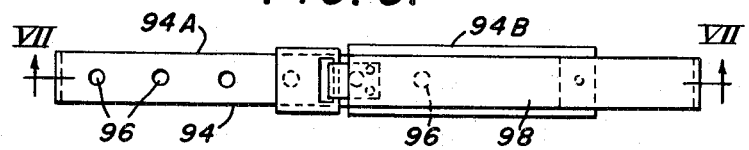
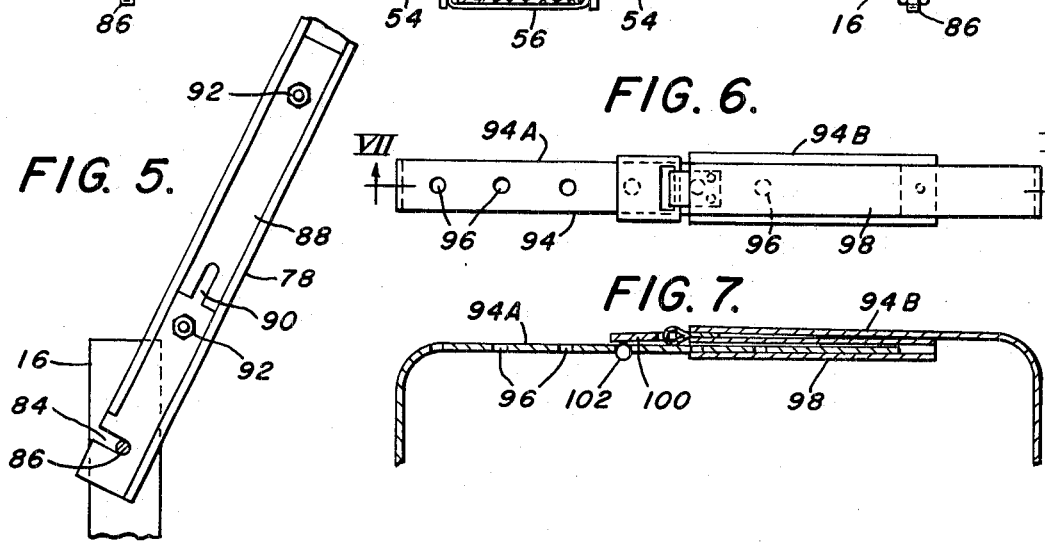
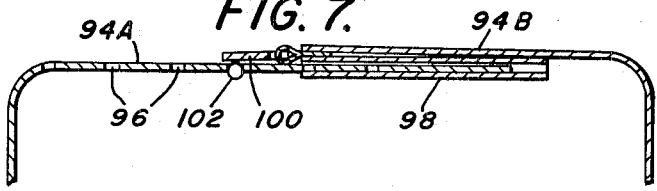
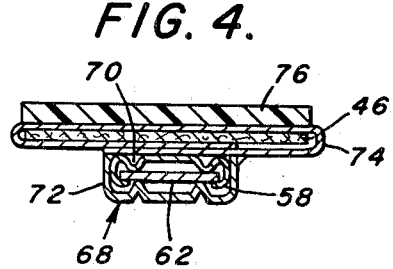
INVENTORS.
SYLVESTER J. ANUSKIEWICZ &
JAMES M. ANUSKIEWICZ
By Brown Murray Flick &
Peckham
Attorneys 3,540,752

ADJUSTABLE LUGGAGE CARRIER

BACKGROUND OF THE INVENTION

As is known, there are may many instances where travelers, particularly women, have difficulty in transporting luggage. Sometimes even at busy airports, train and bus stations, there is no available help to carry luggage from a cab station, for example, to a check-in counter.

In the past, various devices, such as those shown in U.S. Pat. Nos. 1,561,122, 2,132,316 and 2,629,607 have been devised to transport luggage on a wheeled truck which can be strapped to suitcases or the like of various shapes. Most of these devices, however, are relatively clumsy, complicated in construction and either too flimsy or too heavy. Furthermore, with many of these devices, it is necessary to remove the luggage from the carrier before it is checked in at an airport ticket counter or the like, in which case the traveler has the problem of disposing of the carrier until he reaches his destination where it must again be fitted onto the luggage.

SUMMARY OF THE INVENTION

As an overall object, the present invention seeks to provide a new and improved luggage carrier which is light in weight, sturdy in construction, and adaptable to pieces of luggage of various sizes and shapes.

More specifically, an object of the invention is to provide a luggage carrier of the type described incorporating a flexible belt which holds the luggage on a wheeled truck and is provided with a telescoping handle arrangement which enables the device to be easily wheeled over ground surfaces by individuals of different heights. At the same time, the handle can be telescoped into snug abutting relationship with the luggage whereby the luggage, with the carrier attached, presents a compact package which can be transported on aircraft or the like without the necessity of removing the carrier prior to the time that the luggage is checked in.

Still another object of the invention is to provide a carrier of the type described which can be incorporated into a piece of luggage as an integral part thereof.

In accordance with the invention, an adjustable luggage carrier is provided including a truck comprising a pair of generally U-shaped assemblies each having a pair of spaced upstanding leg portions and a lower transverse portion interconnecting the leg portions. A crossbar interconnects the lower transverse portions of the respective U-shaped assemblies; while castered wheels are secured to the bottoms of the lower transverse portions of the U-shaped assemblies for movement of the luggage carrier over ground surfaces with a piece of luggage to be carried resting between the upstanding leg portions of the U-shaped assemblies. Crossmembers interconnect the upstanding leg portions of the respective U-shaped assemblies on either side of the truck.

Extending upwardly from the crossmembers on either side of the truck are vertical support members which receive, for sliding movement, a generally U-shaped handle member. In this manner, the upper transverse portion of the U-shaped handle member, which is grasped by the user of the device in order to move it over ground surfaces, may be moved upwardly or downwardly with respect to a piece of luggage resting on the truck. That is, in order to move the truck with the luggage thereon over a ground surface, the handle is pulled upwardly to a level where it can be comfortably grasped by a user. On the other hand, the handle can be moved downwardly in telescoping relationship with the vertical support members such that it will closely abut the end of the luggage being carried, whereby the luggage, with the carrier still attached, can be checked in at an airline ticket counter or the like without the necessity for removing the carrier from the luggage. The assembly is completed by brace members each having one end connected to one of the vertical support members and another end connected to an associated one of the upstanding leg portions of the U-shaped assemblies to give lateral support to the vertical support members and the handle member slideably associated therewith. Preferably, the piece of luggage is held on the truck, within the U-shaped assemblies, by means of a flexible belt which passes through belt keepers on the vertical support members which support the handle.

Further, in accordance with the invention, the U-shaped assemblies are formed in two parts such that the lateral space between their upstanding leg portions can be varied for pieces of luggage of various widths and shapes. Finally, the brace members are pivotally connected to the vertical support members on either side of the carrier and are removably secured to the U-shaped assemblies such that the entire device may be disassembled and folded into a compact package for storage.

The above and other objects and features of the invention will become apparent from the following detailed description taken in connection with the accompanying drawings which form a part of this specification, and in which:

FIG. 1 is a side view of one embodiment of the invention;

FIG. 2 is an end view of the embodiment of the invention shown in FIG. 1;

FIG. 3 is a bottom view of the embodiment of the invention shown in FIG. 1;

FIG. 4 is a cross-sectional view taken along line IV–IV of FIG. 1 showing the details of the telescoping handle section of the luggage carrier of the invention;

FIG. 5 is an enlarged detailed view showing the manner in which the cross braces of the luggage carriers of FIGS. 1 and 2 can be attached or detached from the truck which supports the luggage to be carried;

FIG. 6 is an enlarged plan view of the adjustable handle of the luggage carrier of the invention; and FIG. 7 is a cross-sectional view taken substantially along line VII–VII of FIG. 6.

With reference now to the drawings, and particularly to FIGS. 1, 2 and 3, the luggage carrier shown includes a lower truck 10 comprising a pair of generally U-shaped assemblies 12 and 14 each having a pair of spaced upstanding leg portions 16 and 18 and a lower transverse portion 20 interconnecting the leg portions.

As best shown in FIGS. 2 and 3, the lower transverse portions 20 are each formed in two parts 20A and 20B having overlapping portions provided with cooperating slots 22 (FIG. 3) which receive wing nuts 24. The end of each overlapping portion is provided with a rivet or nut 26 which extends into the slot provided in the other half of the assembly. With this arrangement, it will be appreciated that by loosening the wing nuts 24, the two halves 20A and 20B may be moved toward or away from each other to accommodate pieces of luggage of various widths. This is perhaps best shown in FIG. 2 where the parts 20A and 20B can move from the inboard full-line positions shown to the outboard dotted-line positions and vice versa. The rivets or bolts 26 which are secured to each part 20A or 20B and extend through the slot in the other part, provide stops for limiting the movement of the two halves 20A and 20B away from each other.

As best shown in FIG. 2, the wing nuts 24 are threaded onto bolts extending downwardly from a rubber bumper 28. On either side of the wing nuts 24 are castered wheels 30 which extend through the parts 20A and 20B of each U-shaped assembly 12 or 14 and are secured to rubber bumpers 32. The bumpers 32, along with bumpers 28, serve to support a piece of luggage, schematically illustrated by the broken lines 34 in FIGS. 1 and 2. As will be understood, these bumpers enable a piece of luggage to be securely fitted onto the truck, notwithstanding any protrusions or flanges at the edges of the piece of luggage being transported.

The two U-shaped assemblies 12 and 14 are interconnected by means of a crossbar 36 which, as shown in FIG. 1, comprises an upper member 38 and two spaced lower members 40 which may be riveted or otherwise securely fastened to the upper member 38. The space between the two members 40 is spanned by means of a plate 42 to provide a space 44 through which a flexible belt 46 extends. The purpose of this belt 46 will hereinafter be described in detail.

Extending between the upstanding leg portions 16 of the U-shaped assemblies 12 and 14 on one side of the truck 10 is a cross member 48 riveted as at 50 (FIG. 1) to the respective upstanding leg portions 16. Similarly, a crossmember 52 (FIG. 3) extends between the upstanding leg portions 18 of the U-shaped assemblies 12 and 14 and is securely fastened thereto by means of rivets or the like. The crossmembers 48 and 52 are each provided with L-shaped flanges 54 (FIGS. 1 and 3) which receive belt keepers 56. These belt keepers 56 preferably are loosely fitted within the flanges 54 such that the device can be subsequently folded into a compact package for storage in a manner hereinafter described. Secured to the belt keepers 56, and extending upwardly from the crossmembers 48 and 52 are vertical channel support members 58 and 60 which receive, for telescoping sliding movement, the opposite legs 62, and 64 of a generally U-shaped handle 66. Surrounding each channel member 58 or 60 and secured thereto are three belt keepers 68 through which the belt 46 passes.

The details of the vertical channel members 58 and 60, the legs 62 and 64 of the handle 66, and the belt keepers 68 are shown in FIG. 4. Thus, the vertical channel support member 58, for example, is provided with crimped portions 70 which guide and support the downwardly depending leg portion 62 of the handle 66. The crimped portions 70 permit the leg portion 62 to slide upwardly or downwardly within the vertical supporting channel member 58 under slight pressure but, at the same time, will maintain the handle at any desired height. Thus, the handle may be moved from the full-line position shown in FIG. 2 to the upper dotted-line position and vice versa by simply applying a slight amount of pressure to it. Surrounding the channel member 58 is the belt keeper assembly 68 which includes an outer U-shaped member 72 connected to a loop 74 through which the belt 46 passes. A sponge rubber pad 76 or the like may be secured to the inside surface of the loop 74 to prevent it from marring or damaging the luggage being carried.

Pivotally connected to the vertical channel members 58 and 60 are brace members in the form of channel sections 78 and 80 (FIG. 1). Each channel section 78 and 80 is pivotally connected to the vertical channel member 58 at 82 and is provided with a lower end connected to the upstanding leg portion 16 of an associated one of the U-shaped assembly 12 or 14. The manner in which the channel sections 78 and 80 are connected to the upstanding leg portions is shown in FIG. 5. The lower end of the channel portion 78, for example, is provided with a slot 84 which can slide over a pin 86 projecting outwardly from the upstanding leg portion 16. This pin may be the shank portion of a rivet or bolt. Once the slot 84 is fitted over the pin 86, a keeper member 88, slideable within the channel section 78, is moved downwardly from the position shown in FIG. 5 until a slot 90 in its lower edge passes over the pin 86, thereby preventing channel portion 78 from slipping free of pin 86. Bolts 92 in the channel section 78 and keeper 88, respectively, engage each other at the lower end of travel of keeper 88 and prevent it from sliding out of the channel member when channel portion 78 is disconnected from the upstanding leg portion 16.

With the arrangement shown, and as best illustrated in FIG. 1, the channel sections 78 and 80 provide lateral strength for the vertical channel supports 58 and 60 and the handle 66. In this respect, lateral forces imparted to the handle 66 at right angles to the plane of the drawing of FIG. 1, for example, will be transmitted through channel sections 78 and 80 to the lower truck 10, whereby the handle 66 will not bow under the influence of such lateral forces, even though the weight of the piece of luggage 34 might be relatively large. At the same time, by disengaging the lower end of the channel sections 78 and 80 from the upstanding leg portions of the U-shaped assemblies 12 and 14 on either side thereof, and by removing the belt keeper 56 from between the flanges 54, the entire assembly can be folded into a compact package for storage.

As will be understood, when the parts 20A and 20B of the U-shaped assemblies 12 and 14 move together or apart, it is also necessary to vary the lateral spacing between the telescoping legs 62 and 64 of the handle 66. For this purpose, the upper part of the handle is provided with the assembly shown in FIGS. 6 and 7. It will be noted that the upper transverse section 94 of the handle 66 is formed in two parts 94A and 94B. Part 94A is provided with a plurality of spaced openings 96; while part 94B is provided with a sleeve 98 which slides over part 94A. Hingedly carried on the forward end of the sleeve 98 is a latch 100 having a ball or detent 102 adapted to be inserted into any one of the openings 96. In this manner, the spacing between the downwardly depending legs 62 and 64 can be adjusted by simply rotating the latch 100 upwardly to remove the ball 102 from an opening 96, followed by sliding movement of the sleeve 98 over portion 94A until the correct spacing is achieved, whereupon the latch 100 may be rotated downwardly until the ball 102 engages or fits into another one of the openings 96.

The belt 46, as best shown in FIG. 3, is provided with a buckle 104. The belt 46 can slide within all of the belt keepers 68, 56, and the opening 44. In order to load a piece of luggage onto the carrier, the buckle 104 is loosened; the piece of luggage is inserted within the belt; and the belt then drawn tightly around the piece of luggage. At this point, the handle 66 can be either moved upwardly or downwardly to accommodate the height of the hand of the user. However, when it is desired to check the luggage at an airline ticket counter, for example, it is only necessary to slide the handle 66 downwardly within the vertical channel members 58 and 60 until the upper transverse portion 94 of the handle abuts the end of the luggage. At this point, the luggage can be picked up by its handle 106, for example, just as if the carrier were not strapped around it and placed on a conveyor for subsequent loading into the baggage storage compartment of an aircraft. In this respect, it will be appreciated that because of the compact and closely fitting nature of the carrier around the piece of luggage, it can remain on the luggage while it is being transported by a public transportation facility, or inserted into the trunk of an automobile without taking up an excessive amount of space. The only portion of the carrier which projects from what would otherwise be the outside dimensions of the luggage are the castered wheels 30; however, these can be made relatively small and unobstrusive.

Although the invention has been shown in connection with a certain specific embodiment, it will be readily apparent to those skilled in the art that various changes in form and arrangement of parts may be made to suit requirements without departing from the spirit and scope of the invention. In this respect, it will be appreciated that the carrier of the invention can be built into a piece of luggage as an integral part thereof, in which case only the wheels 30 will project from one side and the handle 66 from the other side. All other parts will be concealed within the luggage itself; and the belt 46 will be unnecessary.

We claim:

1. A luggage carrier including a truck comprising a pair of generally U-shaped assemblies each having a pair of spaced upstanding leg portions and a lower transverse portion interconnecting the leg portions, a crossbar interconnecting said lower transverse portions of the respective U-shaped assemblies, castered wheels secured to the bottoms of said lower transverse portions of the U-shaped assemblies for movement of the luggage carrier over ground surfaces with a piece of luggage to be carried resting on said lower transverse portions between the upstanding leg portions of the U-shaped assemblies, crossmembers extending parallel to said crossbar and interconnecting the upstanding portions of the respective U-shaped assemblies on either side of said truck, vertical support members extending upwardly from said crossmembers on either side of said truck, a generally U-shaped handle member having an upper transverse portion and downwardly depending leg portions slideably associated with said vertical support members whereby the upper transverse portion may be moved upwardly or downwardly with respect to a piece of luggage resting on said truck, and brace members each having one end connected to one of said vertical support members and another end connected to an associated one of said upstanding leg portions of the U-shaped assemblies to give lateral support to said vertical support members and the handle member slideably associated therewith.

2. The luggage carrier of claim 1 wherein said vertical support members extending upwardly on either side of said truck comprise channel members adapted to receive the downwardly depending leg portions of said U-shaped handle member.

3. The luggage carrier of claim 1 including belt keepers secured to said vertical support members, and a belt passing through said belt keepers and adapted to encircle and secure a piece of luggage carrier on said truck.

4. The luggage carrier of claim 3 wherein said belt member is provided with a buckle at the bottom of said truck.

5. The luggage carrier of claim 1 wherein the lower transverse portions of said generally U-shaped assemblies are formed in two parts and are slideable with respect to each other whereby the spacing between said upstanding leg portions can be varied.

6. The luggage carrier of claim 5 wherein the upper transverse portion of said handle member is formed in two parts, one of which is slideably received within the other whereby the spacing between said downwardly depending leg portions can be varied.

7. The luggage carrier of claim 1 wherein said brace members are each pivotally connected to an associated one of said vertical support members and are detachably connected to an associated one of said upstanding leg portions of the U-shaped assemblies.

8. The luggage carrier of claim 7 wherein said brace members are in the form of channels having slots in their lower ends which receive pins projecting outwardly from said upstanding leg portions of the U-shaped assemblies, and including keeper members slideable within said channels for maintaining said pin within said slot.